(12) United States Patent
Tanaka et al.

(10) Patent No.: US 6,904,383 B2
(45) Date of Patent: Jun. 7, 2005

(54) DISTANCE FACTOR LEARNING DEVICE, DISTANCE FACTOR LEARNING METHOD, DISTANCE FACTOR LEARNING PROGRAM, RECORDING MEDIUM RECORDING SAID PROGRAM, MOVEMENT CONDITION COMPUTING DEVICE, AND PRESENT POSITION COMPUTING DEVICE

(75) Inventors: Kazuaki Tanaka, Kawagoe (JP); Seiji Goto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 33 days.

(21) Appl. No.: 10/422,821

(22) Filed: Apr. 25, 2003

(65) Prior Publication Data

US 2003/0204310 A1 Oct. 30, 2003

(30) Foreign Application Priority Data

Apr. 26, 2002 (JP) ....................... 2002-127401

(51) Int. Cl.[7] .................. G01B 11/24; G01C 17/38; G01C 21/26; H04B 7/185
(52) U.S. Cl. ................. 702/169; 702/94; 702/150; 701/216; 342/357.08; 342/357.09
(58) Field of Search ....................... 702/169, 94, 95, 702/142, 149, 150, 152; 701/213, 216, 224; 342/357.01, 357.06, 357.07, 357.08, 357.09, 457

(56) References Cited

U.S. PATENT DOCUMENTS 5,890,092 A * 3/1999 Kato et al. .............. 701/216

FOREIGN PATENT DOCUMENTS

| DE | 196 25 270 A1 | 1/1998 |
|---|---|---|
| EP | 0 544 403 A1 | 6/1993 |
| EP | 0 690 314 A1 | 1/1996 |
| EP | 0 763 713 A2 | 3/1997 |
| EP | 1 162 465 A1 | 12/2001 |

OTHER PUBLICATIONS

European Search Report.

* cited by examiner

Primary Examiner—John Barlow
Assistant Examiner—Meagan S Walling
(74) Attorney, Agent, or Firm—Armstrong, Kratz, Quintos, Hanson & Brooks, LLP

(57) ABSTRACT

A signal acquisition section 19 acquires, for example, a vehicle velocity pulse signal, which is generated from a vehicle velocity sensor 8 in accordance with the movement of a vehicle that is a mobile body. A distance information acquisition section 20 acquires distance information concerning the movement distance of the vehicle from a GPS receiver 2. A distance factor computing section 21 computes a distance factor value based on the acquired vehicle velocity pulse signal and distance information. A change detection section 23 then compares this computed distance factor value and a distance factor reference value stored in a reference value storage section 30 to detect a continuous change of the distance factor value. That is, change detection section 23 detects a change of tire outer diameter due to a change of the pneumatic pressure of the vehicle's tire or tire exchange, etc. When the change of tire outer diameter is detected by change detection section 23, a distance factor correction section 26 corrects the distance factor reference value speedily and appropriately.

31 Claims, 6 Drawing Sheets

DISTANCE FACTOR LEARNING DEVICE, DISTANCE FACTOR LEARNING METHOD, DISTANCE FACTOR LEARNING PROGRAM, RECORDING MEDIUM RECORDING SAID PROGRAM, MOVEMENT CONDITION COMPUTING DEVICE, AND PRESENT POSITION COMPUTING DEVICE

BACKGROUND OF THE INVENTION

1. Field of the Invention

The present invention relates to a distance factor learning device, which computes a distance factor value based on a signal generated in accordance with the movement of a mobile body and on distance information concerning the movement distance of the mobile body, and also concerns a distance factor learning method, a distance factor learning program, a recording medium recording the program, a movement condition computing device, and a present position computing device.

2. Description of Related Art

Vehicle-installed navigation devices have been known since prior, and such a device is installed in a vehicle, which is mobile body, for detection of the vehicle's movement condition and determination of the vehicle's present position based on the vehicle's movement condition.

This vehicle-installed navigation device is equipped with a GPS receiver, a computing device, a map storage device, and a display device.

With this vehicle-installed navigation device, the abovementioned computing device generates distance information and traveling direction information on the vehicle based on sensor outputs output from a vehicle velocity sensor and a yaw rate sensor.

Also this vehicle-installed navigation device detects the relative movement distance and relative movement direction of the vehicle at each unit time based on the distance information and traveling direction information. The navigation device then computes the present position of the vehicle from position information obtained from the GPS receiver and position information obtained based on the relative movement distance and relative movement direction. Thereafter, the map information stored in the map storage device are read and the computed present position is overlapped onto and displayed along with the map information on the display device, the position of one's own vehicle is determined.

Here, the vehicle velocity sensor outputs a vehicle velocity pulse signal at time intervals proportional to the rotation speed, for example, of a transmission output shaft or a wheel. The relative movement distance of the vehicle is then determined by multiplying the number of vehicle velocity pulses, which is based on the vehicle velocity pulse signal output at the vehicle velocity sensor, by a predetermined distance factor value as shown below in [Equation 1].

Relative movement distance=Number of vehicle velocity pulses× Distance factor value  [Equation 1]

This distance factor value is the movement distance per single pulse of the vehicle velocity pulse signal and is computed based on the amount of movement of the GPS position obtained by the GPS receiver and the number of vehicle velocity pulses.

However, when the outer diameter of a tire of the vehicle changes due to a change of the pneumatic pressure of the tire or exchange of the tire, etc., the movement distance per single pulse of the vehicle velocity pulse signal and the timing at which the vehicle velocity pulse signal is output will differ before and after the change of the tire outer diameter. The distance factor value therefore needed to be corrected as necessary.

Thus prior, an averaging process, etc., was applied constantly to the computed distance factor value to correct the distance factor value, and the variation of the distance factor value was converged gradually to accommodate for a change in the outer diameter of a tire.

However, with the prior-art correction of the distance factor value, much time was required for the distance factor value to converge after a change of the vehicle's tire outer diameter. Thus until the distance factor value converged, errors occurred in the distance factor value, and this prevented the computing of an accurate relative movement distance or relative movement velocity and thus prevented accurate positioning of one's own vehicle.

SUMMARY OF THE INVENTION

An object of this invention is to provide, in view of the above problem, a distance factor learning device, which can correct the distance factor value rapidly and appropriately, as well as a distance factor learning method, a distance factor learning program, a recording medium recording this program, a movement condition computing device, which can compute an appropriate relative movement distance and relative movement velocity based on the distance factor value computed by the distance factor learning device, and a present position computing device, which can detect the movement condition and determine the present position of a moving body based on the relative movement distance and relative movement velocity computed at the movement condition computing device.

This invention's distance factor learning device comprises: a signal acquisition section, acquiring a signal that is generated in accordance with the movement of a mobile body; a distance information acquisition section, acquiring distance information concerning the movement distance of the abovementioned mobile body; a distance factor computing section, computing a distance factor value based on the abovementioned signal and the abovementioned distance information; a reference value storage section, storing a distance factor reference value that is in accordance with the movement characteristics of the abovementioned mobile body; a change detection section, comparing the abovementioned distance factor value with the abovementioned distance factor reference value and thereby detecting a continuous change of the abovementioned distance factor value; and a distance factor correction section, correcting the abovementioned distance factor reference value when a continuous change of the abovementioned distance factor value is detected by the abovementioned change detection section.

With this invention, the signal acquisition section acquires a signal that is generated in accordance with the movement of the mobile body. The distance information acquisition section acquires distance information concerning the movement distance of the mobile body. The distance factor computing section computes the distance factor value based on the acquired signal and distance information. The change detection section compares this computed distance factor value and the distance factor reference value, which is in accordance with the movement characteristics of the mobile body, to detect a continuous change of the distance factor value. Here, when a continuous change of the distance factor value is detected by the change detection section, the distance factor correction section corrects the distance factor reference value. Thus by the change detection section detecting a continuous change of the distance factor value by comparing the distance factor value with the distance factor reference value, a change of a movement characteristic of the mobile body, such as a change of the outer diameter of a tire of the vehicle, which is the mobile body, due to change of the pneumatic pressure of the tire or exchange of the tire, etc., can be detected. Also, by the distance factor correcting section correcting the distance factor reference value when a continuous change of the distance factor value is detected by the change detection section, the distance factor reference value can be corrected rapidly and appropriately after a change of a movement characteristic of the mobile body, such as a change of the outer diameter of a tire, etc., This invention's distance factor learning device is preferably equipped with an error information computing section, computing distance factor error information based on the distance factor value and the distance factor reference value, and the distance factor correction section preferably corrects the distance factor reference value based on this distance factor error information.

With this arrangement, the error information computing section computes distance factor error information based on the distance factor value and the distance factor reference value. The distance factor correction section corrects the distance factor reference value based on the computed distance factor error information. The distance factor correction section can thus correct the distance factor reference value appropriately based on the distance factor error information. The distance factor reference value can thus be corrected rapidly and appropriately after a change of a movement characteristic of the mobile body, such as a change of the outer diameter of a tire.

This invention's distance factor learning device is preferably equipped with an error information accumulation section, accumulating the distance factor error information, and when a continuous change of the distance factor value is detected by the change detection section, the distance factor correction section preferably averages the distance factor error information, which, among the distance factor error information accumulated in the abovementioned error information accumulation section, have been accumulated from the point in time of the start of the abovementioned continuous change of the distance factor value, to compute a correction value for the distance factor reference value and corrects the abovementioned distance factor reference value by adding or subtracting this correction value to or from the abovementioned distance factor reference value.

With this arrangement, the error information accumulation section accumulates the computed distance factor error information. Here, when a continuous change of the distance factor value is detected by the change detection section, the distance factor correction section averages the distance factor error information, which, among the distance factor error information accumulated in the error information accumulation section, have been accumulated from the point in time of the start of the continuous change of the distance factor value, to compute the correction value for the distance factor reference value. The distance factor correction section then corrects the distance factor reference value by adding or subtracting the computed correction value to or from the distance factor reference value. Thus by the averaging of the distance factor error information that have been accumulated from the point in time of the start of the continuous change of the distance factor value, the correction value for the distance factor reference value can be computed appropriately, for example, even when the distance factor error information varies. By then adding or subtracting this correction value to or from the distance factor reference value, the distance factor reference value can be corrected appropriately. The distance factor reference value can thus be corrected rapidly and appropriately by a simple computation after a change of a movement characteristic of the mobile body, such as a change of the outer diameter of a tire.

With this invention's distance factor learning device, the distance factor correction section preferably corrects the distance factor reference value based on the distance factor value.

With this arrangement, the distance factor correction section corrects the distance factor reference value based on the distance factor value. The distance factor correction section can thus correct the distance factor reference value appropriately based on the distance factor value computed at the distance factor computing section. The distance factor reference value can thus be corrected rapidly and appropriately after a change of a movement characteristic of the mobile body, such as a change of the outer diameter of a tire.

This invention's distance factor learning device is preferably equipped with a distance factor accumulation section, accumulating the distance factor values, and when a continuous change of the distance factor value is detected by the change detection section, the distance factor correction section preferably averages the distance factor values, which, among the distance factor values accumulated in the abovementioned distance factor accumulation section, have been accumulated from the point in time of the start of the abovementioned continuous change of the distance factor value, to compute a modified value of the distance factor reference value and corrects the distance factor reference value that is stored in the reference value storage section by replacing the stored reference value with the computed modified value.

With this arrangement, the distance factor value accumulation section accumulates the distance factor values. Here, when a continuous change of the distance factor value is detected by the change detection section, the distance factor correction section averages the distance factor values, which, among the accumulated distance factor values, have been accumulated from the point in time of the start of the continuous change of the distance factor value, to compute a modified value of the distance factor reference value. The distance factor correction section then corrects the distance factor reference value that is stored in the reference value storage section by replacing the stored reference value with the computed modified value. By the averaging of the distance factor values that have been accumulated from the point in time of the start of the continuous change of the distance factor value, the modified value of the distance factor reference value can be computed appropriately, for example, even when the distance factor values varies. By then correcting the distance factor reference value that is stored in the reference value storage section by replacing the stored reference value with the modified value, the distance factor reference value can be corrected appropriately. The distance factor reference value can thus be corrected rapidly and appropriately by a simple computation upon detection of a change of a movement characteristic of the mobile body, such as a change of the outer diameters of a tire.

This invention's distance factor learning device is preferably equipped with an error information computing section, computing distance factor error information based on the distance factor value and the distance factor reference value, and a counter, counting the number of times the distance factor error information becomes equal to or greater than a threshold value, and the abovementioned change detection section preferably detects that the distance factor value has changed in a continuous manner when the count value counted by the abovementioned counter becomes equal to or greater than a threshold value.

With this arrangement, the error information computing section computes distance factor error information based on the distance factor value and the distance factor reference value. Also, the counter counts the number of times the distance factor error information becomes equal to or greater than the threshold value. And when the count value counted by the abovementioned counter becomes equal to or greater than the threshold value, the change detection section detects that the distance factor value has changed in a continuous manner. A change of a movement characteristic of the mobile body, such as a change of the outer diameter of the vehicle's tire, can thus be detected appropriately based on the count value counted by the counter becoming equal to or greater than the threshold value. The distance factor correction section can thus correct the distance factor reference value rapidly and appropriately after this detection.

This invention's distance factor learning device is preferably equipped with an initializing section, initializing the counter in a case where the distance factor error information does not reach the threshold value.

With this arrangement, the initializing section initializes the counter in a case where the distance factor error information does not reach the threshold value. That, for example, the outer diameter of a tire of the vehicle has changed, can thus be detected by the count value counted at the counter becoming equal to or greater than the threshold value. And if the distance factor error information computed at the error information computing section does not reach the threshold value, the initializing section initializes the count value of this counter. Thus even if the counter performs counting in accordance with distance factor error information containing error of the signal acquired at the signal acquisition section or of the distance information acquired at the distance information acquisition section, the counter can be made to perform appropriate counting by initialization of the count value of this counter.

This invention's distance factor learning method, the above-described distance factor learning device is developed in the form of a distance factor learning method that comprises the steps of: acquiring a signal, which is generated in accordance with the movement of a mobile body, and distance information concerning the movement distance of the abovementioned mobile body; computing a distance factor value based on the acquired signal and distance information; comparing the computed distance factor value with a distance factor reference value that is in accordance with the movement characteristics of the abovementioned mobile body to detect a continuous change of the abovementioned distance factor value; and correcting the abovementioned distance factor reference value when the continuous change of the distance factor value is detected.

With this invention's distance factor learning method, the same actions and effects as this invention's distance factor learning device described above can thereby be obtained.

With this invention's distance factor learning method, by carrying out developments of the arrangement in the same manner as this invention's distance factor learning device described above, the same respective actions and effects can be obtained.

This invention's distance factor learning program is characterized in making a computer execute this invention's distance factor learning method described above.

With this invention, for example a general purpose computer is used and the program is installed in the computer. The computer can thereby be made to execute this invention's distance factor learning method described above to significantly promote the usage of this invention.

This invention's recording medium is characterized in that this invention's distance factor learning program described above is recorded in a manner that is readable by a computer.

With this invention, since the above-described distance factor learning program for executing this invention's distance factor learning method is recorded in a recording medium, the program can be handled readily and the usage of this invention can thus be promoted significantly.

This invention's movement condition computing device comprises: this invention's distance factor learning device described above; and a movement condition computing section, computing movement distance information or velocity information on a mobile body based on a distance factor reference value that is corrected by the distance factor learning device.

Since this invention is equipped with the present invention's distance factor learning device that can perform appropriate correction of the distance factor reference value, the movement distance information or velocity information of the mobile body can be computed accurately.

This invention's present position computing device comprises: this invention's movement condition computing device described above; a direction information acquisition section, acquiring traveling direction information that indicates the traveling direction of the abovementioned mobile body; a movement condition recognition section, computing the relative movement distance and relative movement direction of the abovementioned mobile body at each unit time based on the movement distance information or velocity information computed at the abovementioned movement condition computing device and the traveling direction information acquired at the abovementioned direction information acquisition section and recognizing the movement condition of the abovementioned mobile body based on an accumulation of the relative movement distance and the relative movement direction; and a present position determination section, determining the present position of the abovementioned mobile body based on the movement condition of the mobile body recognized by the movement condition recognition section.

Since this invention is equipped with the movement condition computing device of the seventeenth claim that can compute accurate movement distance information or velocity information on the mobile body, the movement condition of the mobile body can be recognized accurately and the present position of the mobile body can be determined accurately.

DETAILED DESCRIPTION OF PREFERRED EMBODIMENT(S)

[First Embodiment]

The respective embodiments of this invention shall now be described based on the drawings.

(Arrangement of a Navigation Device)

Figure 1:
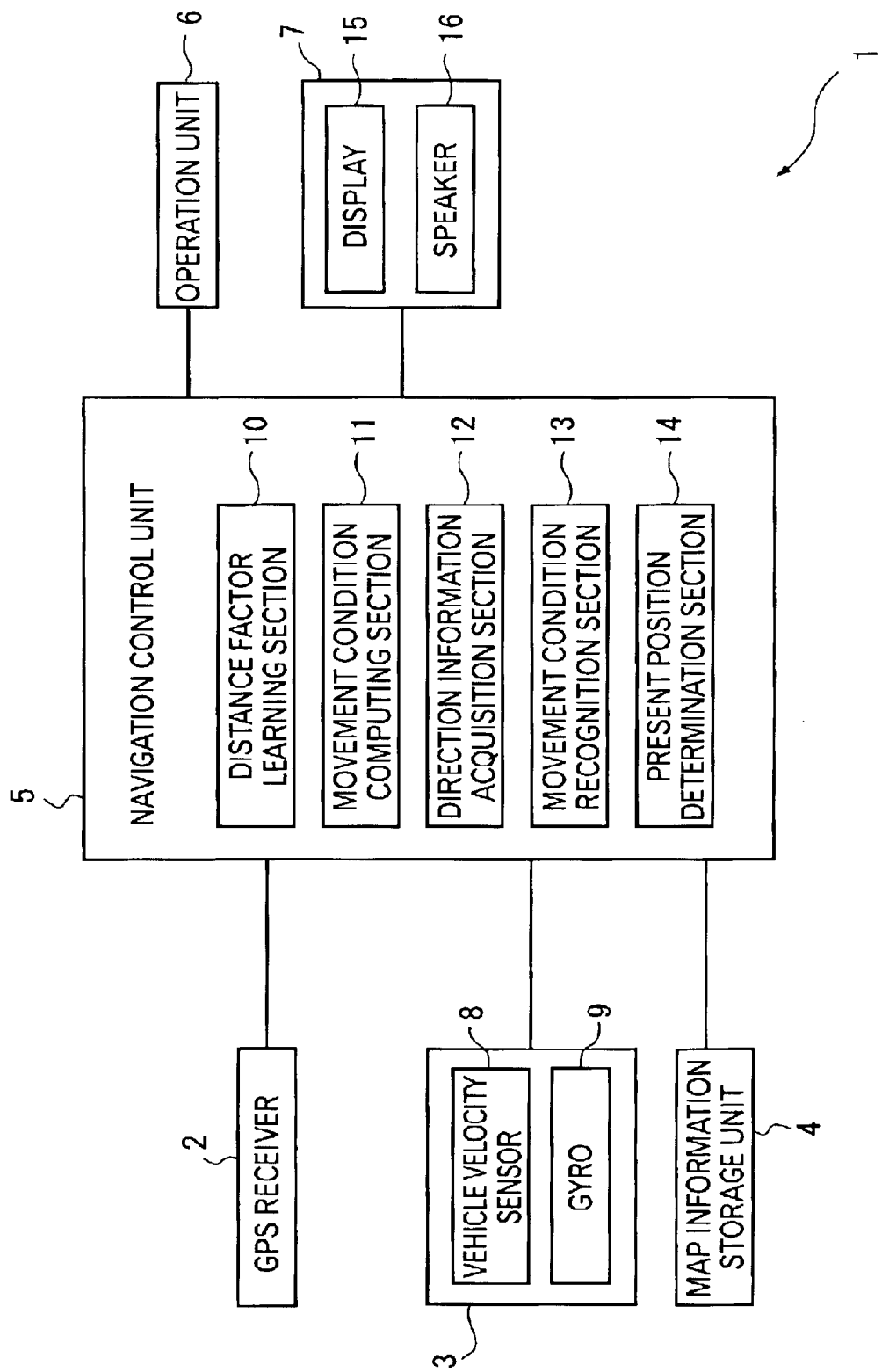
FIG. 1 is a diagram, showing the general arrangement of a navigation device by this invention.

FIG. 1 is a block diagram, showing the general arrangement of a navigation device by this invention. 1 is a vehicle-installed navigation device, and this navigation device 1 is installed in a vehicle, which is a mobile body, to perform determination of the present position of the vehicle. This navigation device 1 is equipped with a GPS receiver 2, a sensor unit 3, a map information storage unit 4, a navigation control unit 5, an operation unit 6, and a notification unit 7.

GPS receiver 2 receives radio waves from a plurality of artificial satellites, computes the present position based on the principles of triangulation, and outputs the position information indicating the computed present position to navigation control unit 5.

Sensor unit 3 detects the displacement that accompanies movement of the vehicle and is equipped with a vehicle velocity sensor 8 and a gyro 9.

Vehicle velocity sensor 8 is disposed on the vehicle and, for example, detects the rotation of an output shaft of the transmission that outputs the driving force from the engine equipped in the vehicle or the rotation speed of a wheel. More specifically, a vehicle velocity pulse signal is detected as distance information of a predetermined number each time the wheel rotates once. This vehicle velocity pulse signal is then output to navigation control unit 5.

Gyro 9 is disposed on the vehicle and detects the vehicle's azimuth angle, that is, the traveling direction in which the vehicle advances. This gyro 9 converts the detected traveling direction to azimuth angle data as traveling direction information in the form, for example, of pulses, voltage, etc., and outputs the traveling direction information to navigation control unit 5. Though a gyro 9 is employed here, a geomagnetic sensor, which detects the absolute direction, etc., may be employed instead.

Map information storage unit 4 stores map information. This map information storage unit 4 is equipped, for example, with a DVD-ROM (Digital Video (or Versatile) Disk-Read Only Memory) drive or a CD-ROM (Compact Disk-Read Only Memory) drive, etc., which respectively reproduces, under the control of navigation control unit 5, the contents of a DVD-ROM disk or a CD-ROM disk in which map information is stored.

Navigation control unit 5 controls the operation of the entirety of navigation device 1. This navigation control unit 5 is equipped with a distance factor learning section 10, which is a distance factor learning device, a movement condition computing section 11, a direction information acquisition section 12, a movement condition recognition section 13, and a present position determination section 14.

Here, distance factor learning section 10 and movement condition computing section 11 correspond to a movement condition computing device. Distance factor learning section 10, movement condition computing section 11, direction information acquisition section 12, movement condition recognition section 13, and present position determination section 14 correspond to a present position computing device.

Navigation control unit 5 comprises a CPU, etc., reads and executes a control program stored in an unillustrated ROM, etc., outputs control signals to the respective components of navigation device 1, and performs input and output of data. Though specific illustration will be omitted, navigation control unit 5 is thus equipped in its interior with a CPU, ROM, RAM, I/O, and bus lines that connect these components.

Though details shall be given later, distance factor learning section 10 acquires the vehicle's position information from GPS receiver 2 and the vehicle velocity pulse signal from vehicle velocity sensor 8 and computes the movement distance (movement factor value) per pulse. Theoretically, by using the distance factor value computed here, the relative movement distance of the vehicle can be computed by the following Equation 2.

Relative movement distance (theoretical value)=Number of vehicle velocity pulses×Distance factor value  [Equation 2]

However, the vehicle position information output from the GPS receiver 2 may contain error. In this case, the distance factor value is computed with this error being contained.

Distance factor learning section 10 is thus equipped with a database 18 to be described later and in this database 18 is stored a distance factor reference value that is in accordance with the vehicle's traveling characteristics, which are the mobile body's movement characteristics. Distance factor learning section 10 corrects this distance factor reference value as necessary in accordance with changes of the computed distance factor value.

Actually, movement condition computing section 11 acquires the distance factor reference value stored in database 18 and, based on this acquired distance factor reference value and the number of vehicle velocity pulses, based in turn on the vehicle velocity pulse signal acquired from vehicle velocity sensor 8 in a predetermined period, computes the vehicle's relative movement distance by the following Equation 3.

Relative movement distance=Number of vehicle velocity pulses× Distance factor reference value  [Equation 3]

Also, this computed relative movement distance or the relative movement velocity based on this relative movement distance is output to movement condition recognition section 13.

Direction information acquisition section 12 acquires the azimuth angle data output from gyro 9, computes the relative movement direction of the vehicle, and outputs the computed relative movement direction of the vehicle to movement condition recognition section 13.

Movement condition recognition section 13 computes the vehicle's relative movement distance and relative movement direction at each unit time based on the relative movement distance or relative movement velocity computed at movement condition computing section 11 and the relative movement direction computed at direction information acquisition section 12 and detects the movement condition of the vehicle based on the accumulation of the relative movement distance and relative movement direction. The detected movement condition of the vehicle is then output to present position determination section 14.

Present position determination section 14 determines the present position of the vehicle. To be more specific, the vehicle's movement condition that has been detected at movement condition recognition section 13 and the position information on the vehicle's present position computed at GPS receiver 2 are acquired. The two information are compared and collated with the map information stored in map information storage unit 4 and the present position is determined by a map matching process, etc., This present position determination section 14 also has a function of controlling notification unit 7 and controls notification unit 7 so that the present position of the vehicle will be displayed.

Operation unit 6 has various unillustrated operation buttons, for example, for instructing the display of the traveling condition, which is the vehicle's movement condition, and other instructions for operation of navigation device 1 as suited. Upon input operation of these operation buttons, operation unit 6 suitably outputs predetermined signals to navigation control unit 5 for setting and inputting various conditions, such as the operation details of navigation device 1. This operation unit 6 is not limited to an arrangement for input operations by section of operation buttons but may also be arranged for the setting and inputting of the various conditions by input operations by section of a touch panel, voice input operations, etc., Notification unit 7 is controlled by navigation control unit 5 and notifies the present position of the vehicle. This notification unit 7 is equipped with a display 15 and a speaker 16.

Under the instruction of navigation control unit 5, display 15 displays the map data, stored in map information storage unit 4, in various modes and displays the vehicle's present position in an overlapping manner. Also in addition to the function of displaying the map data in such a manner, display 15 also suitably displays TV image data received by an unillustrated TV receiver, image data stored in an optical disk, magnetic disk, or other recording medium, and read by a drive, etc. To be more specific, a liquid crystal, organic EL (electroluminescence), PDP (Plasma Display Panel), or CRT (Cathode-Ray Tube), etc., is used as the display.

Speaker 16 outputs various information, such as intersection information based on the vehicle's present position, etc., under the instruction of navigation control unit 5.

(Arrangement of the Distance Factor Learning Section)

Figure 2:
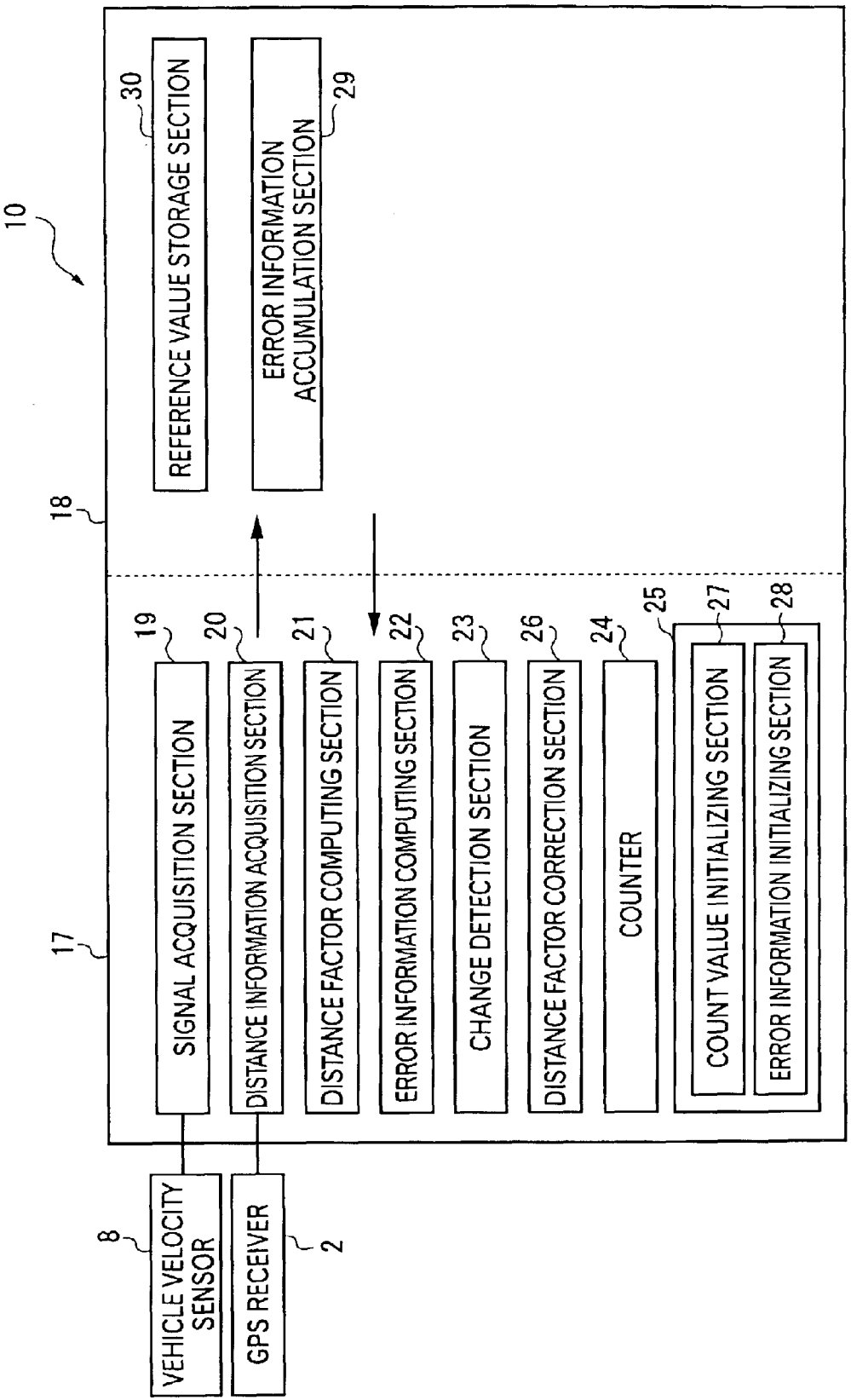
FIG. 2 is a diagram, showing the general arrangement of a distance factor learning section as a distance factor learning device of a first embodiment of this invention.

FIG. 2 is a diagram, showing the general arrangement of distance factor learning section 10 as the distance factor learning device of the first embodiment of this invention. In FIG. 2, 10 is the distance factor learning section and this distance factor learning section 10 corrects the distance factor reference value in accordance with a change of the vehicle's tire outer diameter. This distance factor learning section 10 is equipped with a processing unit 17 and a database 18.

Processing unit 17 performs input and output of data from database 18 and also performs predetermined computation processes. This processing unit 17 is equipped with a signal acquisition section 19, a distance information acquisition section 20, a distance factor computing section 21, an error information computing section 22, a change detection section 23, a counter 24, an initializing section 25, and a distance factor correction section 26.

Signal acquisition section 19 inputs the vehicle velocity pulse signal output from vehicle velocity sensor 8 and acquires the number of velocity pulses within a predetermined period. The acquired number of vehicle velocity pulses is output to distance factor computing section 21.

Distance information acquisition section 20 acquires the position information on the vehicle that is output from GPS receiver 2, and acquires the GPS position movement amount as distance information from the acquired position information on the vehicle, and outputs the acquired GPS position movement amount to distance factor computing section 21.

Distance factor computing section 21 acquires the number of vehicle velocity pulses from signal acquisition section 19 and the GPS position movement amount from distance information acquisition section 20 and computes a distance factor value based on the acquired GPS position movement amount and number of vehicle velocity pulses. The computed distance factor value is output to error information computing section 22.

Error information computing section 22 acquires the distance factor value computed at distance factor computing section 21 and the distance factor reference value stored in database 18, compares this distance factor value and distance factor reference value, and computes distance factor error information based on this distance factor value and distance factor reference value. More specifically, this error information computing section 22 computes the error between the acquired distance factor reference value and the distance factor value. The computed error is then output to database 18 and accumulated there successively. The computed error is also output to change detection section 23.

Change detection section 23 detects a change in the distance factor value computed at distance factor computing section 21. That is, this change detection section 23 acquires the distance factor error information, computed at error information computing section 22, as error, compares this error with a threshold value, and deems the distance factor value to have changed if the error is equal to or greater than the threshold value. The abovementioned threshold value is, for example, a fixed value that is set by a user or maker, etc., and is set to a value by which a change of the vehicle's tire outer diameter can be assumed. If the error is equal to or greater than the threshold value, a signal is output to counter 24. On the other hand, if the error is less than the threshold value, a signal is output to initializing section 25.

In accordance with the signal output from change detection section 23, counter 24 counts the number of times the signal has been output. Change detection section 23 also monitors this counter 24 constantly and, when the count value of counter 24 becomes equal to or greater than a threshold value, outputs a signal to distance factor correction section 26. That is, change detection section 23 detects that the distance factor value changed in a continuous manner by recognizing that the count value at counter 24 has become equal to or greater than the threshold value and thereby detects that the vehicle's tire outer diameter has changed.

Initializing section 25 initializes counter 24 and the distance factor error information stored in database 18 in accordance with the signal output from change detection section 23. This initializing section 25 is equipped with a count value initializing section 27 and an error information initializing section 28.

Count value initializing section 27 initializes the count value counted at counter 24 in accordance with the signal output from change detection section 23. More specifically, when the error computed at error information computing section 22 exceeds the threshold value, this is counted by counter 24. Then if in a state in which the count value that has been counted at counter 24 has not reached the threshold value, the comparison at change detection section 23 results in the error being less than the threshold value, the count value at counter 24 is initialized.

Error information initializing section 28 deletes the distance factor error information accumulated in database 18 in accordance with the signal output from change detection section 23. More specifically, when as a result of comparison of the error and the threshold value at change detection section 23, the error exceeds the threshold value, counter 24 performs counting. Then if in a state in which the count value that has been counted at counter 24 has not reached the threshold value, the comparison at change detection section 23 results in the error being less than the threshold value, the errors that are accumulated as distance factor error information in database 18 are deleted.

By such an initializing section 25, the effects of singular distance factor error information that was computed based on the computing error of the distance factor value by distance factor computing section 21 are eliminated.

Distance factor correction section 26 acquires the distance factor error information accumulated in database 18 and corrects the distance factor reference value based on the distance factor error information. More specifically, when the count value at counter 24 becomes equal to or greater than the threshold value, a signal is output from change detection section 23. In accordance with this signal, distance factor correction section 26 acquires the distance factor error information accumulated in database 18.

However, with the distance factor error information accumulated in database 18, an error may be contained in the GPS position movement amount acquired from distance information acquisition section 20 or the vehicle velocity pulse signal output from vehicle velocity sensor 8. In this case, the distance factor error information will vary due to this error. Distance factor correction section 26 thus averages the acquired distance factor error information to compute a correction value for the distance factor reference section.

Furthermore, distance factor correction section 26 subtracts the correction value from the distance factor reference value stored in database 18 to correct the distance factor reference value. This distance factor correction section 26 thus corrects the distance factor reference value after the count value resulting from counting at counter 24 becomes equal to or greater than the threshold value, that is, after the detection of a change of tire outer diameter. The distance factor reference value stored in database 18 is thereby corrected as necessary by distance factor correction section 26. Movement condition computing section 11 then uses this corrected distance factor reference value to compute the relative movement distance or relative movement velocity.

Database 18 stores the data output from processing unit 17 along with the distance factor reference value used for computation of the relative movement distance or relative movement velocity at movement condition computing section 11. This database 18 is equipped with an error information accumulation section 29 and a reference value storage section 30.

Error information accumulation section 29 is arranged for example from a rewritable SRAM (Static Random Access Memory), etc., and accumulates the distance factor error information computed at error information computing section 22.

Reference value storage section 30 is arranged for example from a rewritable SRAM, etc., and stores the distance factor reference value. This distance factor reference value is corrected as necessary by distance factor correction section 26. For the distance factor reference value that is used at the start of use of navigation device 1, a distance factor value that is in accordance with the vehicle model or the vehicle's tire type is set in advance as the distance factor reference value by a user or maker, etc. Besides being set in advance by a user or maker, etc., this distance factor reference value may instead be set based on the distance factor value computed at distance factor computing section 21.

(Distance Factor Value Learning Method)

Figure 3:
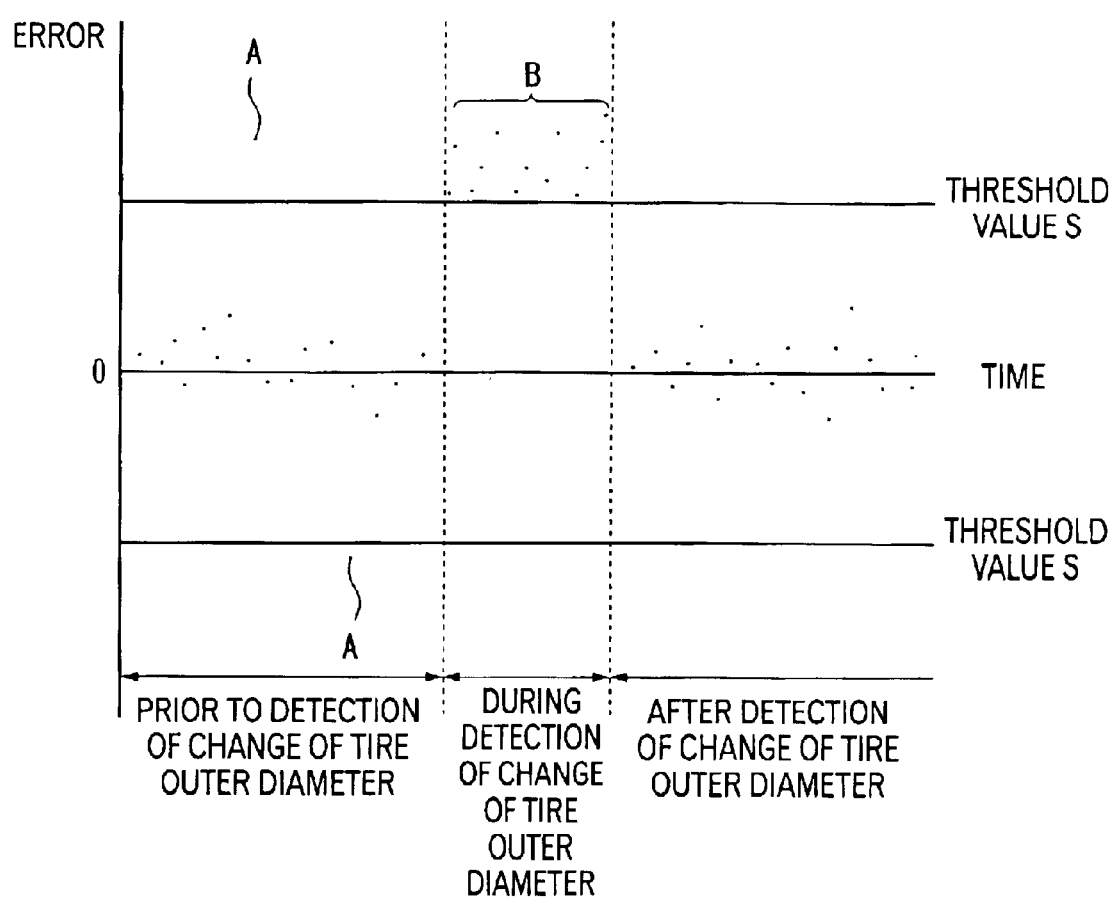
FIG. 3 is a diagram, in which are plotted errors that are the distance factor error information computed by an error information computing section of each embodiment of this invention.
Figure 4:
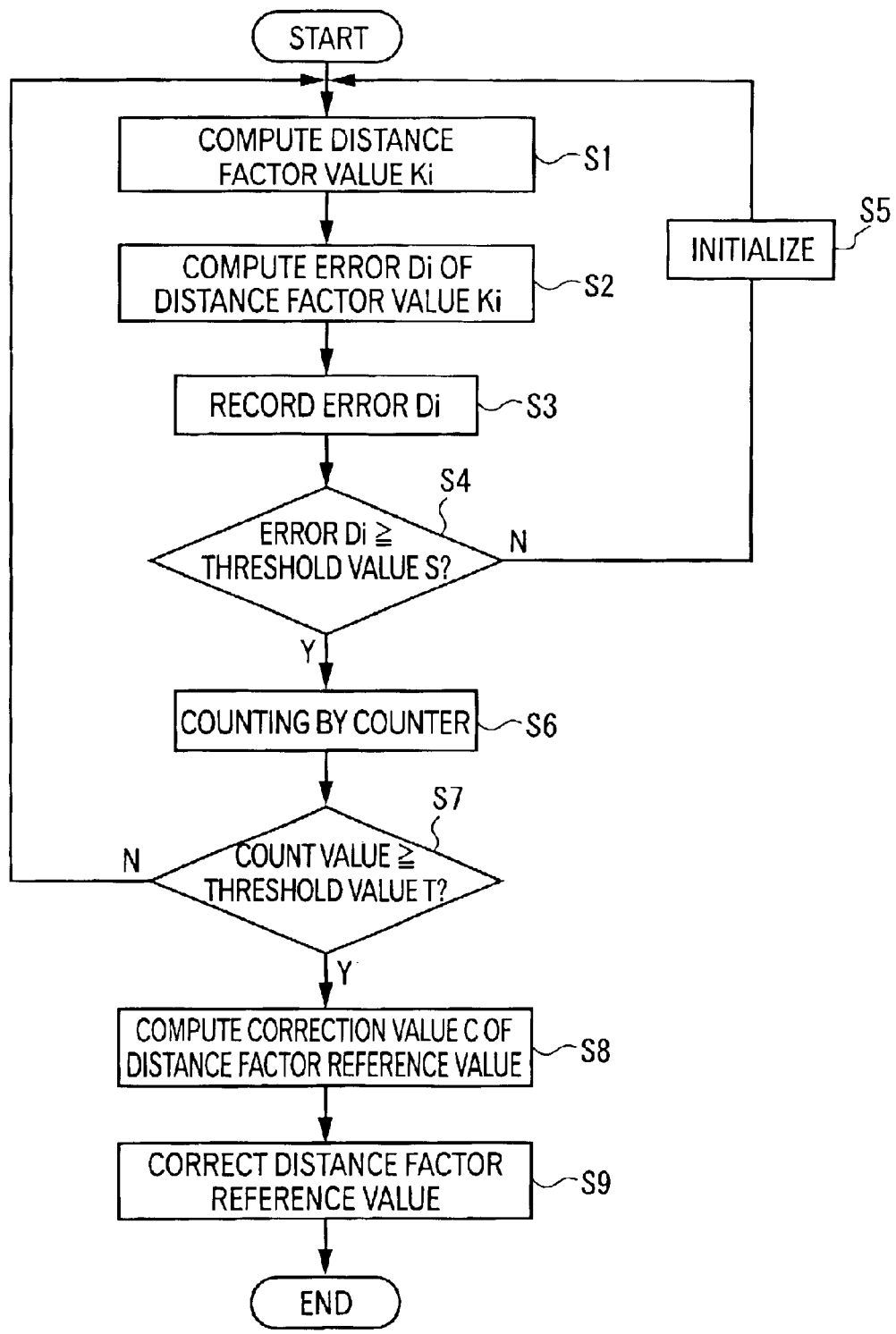
FIG. 4 is a flowchart, illustrating a distance factor learning method implemented by the distance factor learning section of the first embodiment of this invention.

FIG. 3 is a diagram, in which are plotted errors that are the distance factor error information computed by the error information computing section. FIG. 4 is a flowchart, illustrating the method of distance factor learning by the distance factor learning section.

The distance factor learning method of distance factor learning section 10 shall now be described with reference to FIG. 3 and the flowchart shown in FIG. 4.

First, distance factor computing section 21 acquires the number of vehicle velocity pulses of vehicle velocity sensor 8 that have been acquired by signal acquisition section 19 within a fixed period and the GPS position movement amount acquired at distance information acquisition section 20. The distance factor value Ki, which is the movement distance per pulse is then computed based on the acquired number of vehicle velocity pulses and the GPS position movement amount (step S1).

Error information computing section 22 then acquires the distance factor value Ki that was computed in step S1 and acquires a distance factor reference value G that is stored in reference value storage mean 30. Error information computing section 22 then computes an error Di between distance factor reference value G and distance factor value Ki by the following Equation 4 (step S2).

$$\text{Error } Di = \text{Distance factor reference value } G - \text{Distance factor value } Ki \quad \text{[Equation 4]}$$

Error information computing section 22 then outputs error Di as distance factor error information to error information accumulation section 29, and error information accumulation section 29 accumulates this error Di (step S3).

Change detection section 23 acquires the error Di that was computed in step S2 and compares this error Di with a threshold value S (FIG. 3) (step S4).

If in step S4, error Di is less than threshold value S, change detection section 23 outputs a signal to initializing section 25. Initialization of the count value of counter 24 is then performed by count value initializing section 27 and the deletion of the errors Di accumulated in error information accumulation section 29 is then performed by error information initializing section 28 (step S5). A return to step S1 is then performed and the computing of distance factor value Ki at distance factor computing section 21 is performed again. Thus in this case, movement condition computing section 11 uses the distance factor reference value G stored in reference value storage section 30 and the number of vehicle velocity pulses acquired within a predetermined period at signal acquisition section 19 to compute the relative movement distance by the following Equation 5.

$$\text{Relative movement distance} = \text{Number of vehicle velocity pulses} \times \text{Distance factor reference value } G \quad \text{[Equation 5]}$$

That is, this state corresponds to the state prior to the detection of a change of the vehicle's tire outer diameter shown in FIG. 3. As mentioned above, here, error Di exhibits a value lower than threshold value S and the relative movement distance is computed using distance factor reference value G.

If in step S4, error Di is equal to or greater than threshold value S, change detection section 23 outputs a signal to counter 24 and counter 24 performs counting (step S6).

Change detection section 23 then judges whether or not the count value resulting from the counting at step S6 is equal to or greater than a threshold value T (step S7).

If in step S7, the count value is less than threshold value T, a return to step S1 is performed again and the processes from step S1 to step S6 are repeated successively. That is, the above processes are repeated until the count value resulting from counting at counter 24 becomes equal to or greater than threshold value T.

If in repeating the above-described processes of step S1 to step S6, an error Di is found to indicate a value less than threshold value S as a result of comparison of error Di and threshold value S by change detection section 23, change detection section 23 outputs a signal to initializing section 25. Initialization of the count value of counter 24 by count value initializing section 27 and the deletion of the errors Di accumulated in error information accumulation section 29 by error information initializing section 28 are then performed in step S5.

More specifically, even if an error Di, such as that indicated by a point A in FIG. 3, is equal to or greater than threshold value S, if the subsequently computed error Di is less than threshold value S, initialization of the count value of counter 24 by initializing section 25 and the deletion of the errors Di accumulated in error information accumulation section 29 will be performed. A singularity (point A) due to detection error of the GPS position movement amount from GPS receiver 2 or detection error of vehicle velocity sensor 8 is thus eliminated.

Thus when in step S7, the count value of counter 24 becomes equal to or greater than threshold value T, only the errors Di, at points at which error Di was found to be greater than or equal to threshold value S as a result of comparison of error Di with threshold value S at change detection section 23, will have been accumulated in error information accumulation section 29.

Here, in repeating the above-described processes from step S1 to step S6, points, at which error Di is found to be equal to or greater than threshold value S as a result of comparison of error Di and threshold value S at change detection section 23, are generated in continuation in step S4. This thus corresponds to the state shown in FIG. 3 wherein a change of tire outer diameter is being detected. In such a case where points (points B) at which error Di is equal to or greater than threshold value S are generated continuously, processes are performed upon deeming that a change of tire outer diameter has occurred.

Thus if in step S7, the count value of counter 24 is equal to or greater than threshold value T, change detection section 23 detects that a change of tire outer diameter has occurred and the correction of the distance factor reference value is performed. Change detection section 23 thus outputs a signal to distance factor correction section 26 after detection of a change of the vehicle's tire outer diameter.

In accordance with the signal from counter 24, distance factor correction section 26 acquires the errors Di accumulated in error information accumulation section 29 and averages the acquired errors Di to compute a correction value C (step S8).

Distance factor correction section 26 then uses the distance factor reference value G, stored in reference value storage section 30, and the computed correction value C to compute a distance factor reference value H by the following Equation 6.

Distance factor reference value $H$=Distance factor reference value $G$−Correction value $C$ [Equation 6]

Distance factor correction section 26 then outputs this computed distance factor reference value H to reference value storage section 30 to rewrite distance factor reference value G with distance factor reference value H and thereby correct the distance factor reference value (step S9).

After the correction of the distance factor reference value has been performed in the above manner, error information computing section 22 uses the distance factor reference value H stored in reference value storage section 30 to compute error Di. More specifically, this state corresponds to the state, shown in FIG. 3, after detection of a change of the vehicle's tire outer diameter, which corresponds to a change of a traveling characteristic of the vehicle. By error information computing section 22 computing the error Di using the distance factor reference value H after the change of tire outer diameter has been detected, error Di comes to settle down near 0.

Also, movement condition computing section 11 computes the relative movement distance or the relative movement velocity using the distance factor reference value H stored in reference value storage section 30 and the number of vehicle velocity pulses based on the vehicle velocity pulse signal acquired within a predetermined period at signal acquisition section 19.

By repeating the processes described above and correcting the distance factor reference value after detection of a change of the vehicle's tire outer diameter, appropriate relative movement distances or relative movement velocities are computed.

(Effects of the First Embodiment)

With the above-described navigation device 1 of the first embodiment, error information computing section 22 computes the error Di between distance factor reference value G and distance factor value Ki. Change detection section 23 then acquires this error Di and compares this error Di with threshold value S. If as a result of comparison, error Di is found to be equal to or greater than threshold value S, counter 24 counts the number of times this has occurred. Change detection section 23 monitors counter 24 and can detect a change of the vehicle's tire outer diameter when the count value counted by counter 24 becomes equal to or greater than threshold value T.

After detection of the change of the vehicle's tire outer diameter, distance factor correction section 26 averages the errors Di, which, among the errors Di accumulated in error information accumulation section 29, have been accumulated from the point in time of the start of the continuous change of distance factor values, to compute the correction value C for the distance factor reference value. Distance factor correction section 26 then subtracts this correction value C from the distance factor reference value G stored in reference value storage section 30 to compute distance factor reference value H and thereby correct the distance factor reference value.

Distance factor correction section 26 can thus compute correction value C and use this modification value C to correct the distance factor reference value after detection of a change of tire outer diameter. The distance factor reference value can thereby be corrected appropriately and yet rapidly. Also by use of the corrected distance factor reference value H an accurate relative movement distance or relative movement velocity can be computed.

By averaging the errors Di to compute correction value C for the distance factor reference value, distance factor correction section 26 can compute the correction value for the distance factor reference value appropriately even if errors Di, which contain computation errors of the GPS position movement amount due to GPS receiver 2, etc., are included in the data accumulated in error information accumulation section 29.

Also, if while the number of times error Di is equal to or greater than threshold value S is being counted repeatedly by counter 24, an error Di is found to be less than threshold value S as a result of comparison of error Di and threshold value S at change detection section 23, change detection section 23 outputs a signal to initializing section 25. Initializing section 25 then performs initialization of the count value of counter 24 and the deletion of the errors Di accumulated in error information accumulation section 29. Change detection section 23 can therefore detect a change of the vehicle's tire outer diameter appropriately by monitoring the appropriately counted count value of counter 24.

[Second Embodiment]

A second embodiment of this invention shall now be described.

In the description that follows, structures and members that are the same as those of the above-described first embodiment shall be provided with the same symbols and detailed descriptions thereof shall be omitted.

With the first embodiment, when as a result of the comparison of an error Di and threshold value S by change detection section 23, the error Di is found to be equal to or greater than threshold value S, counter 24 performs counting. And when the count value at counter 24 becomes equal to or greater than threshold value T, distance factor correction section 26 computes correction value C using, from among the errors Di accumulated in error information accumulation section 29, the errors Di that have been accumulated from the point in time of the start of the continuous change of the distance factor value. Distance factor correction section 26 then subtracts this correction value C from distance factor reference value G stored in reference value storage section 30 to correct the distance factor reference value.

Meanwhile, with the second embodiment, the distance factor value Ki that has been computed at distance factor computing section 21 is accumulated in database 18. Counter 24 performs counting when an error Di is equal to or greater than threshold value S. Distance factor correction section 26 computes a modified value A based on the distance factor values Ki accumulated in database 18 when the count value at counter 24 becomes equal to or greater than threshold value T. This embodiment differs in that distance factor correction section 26 replaces the distance factor reference value G that is stored in database 18 by this computed modified value A.

Figure 5:
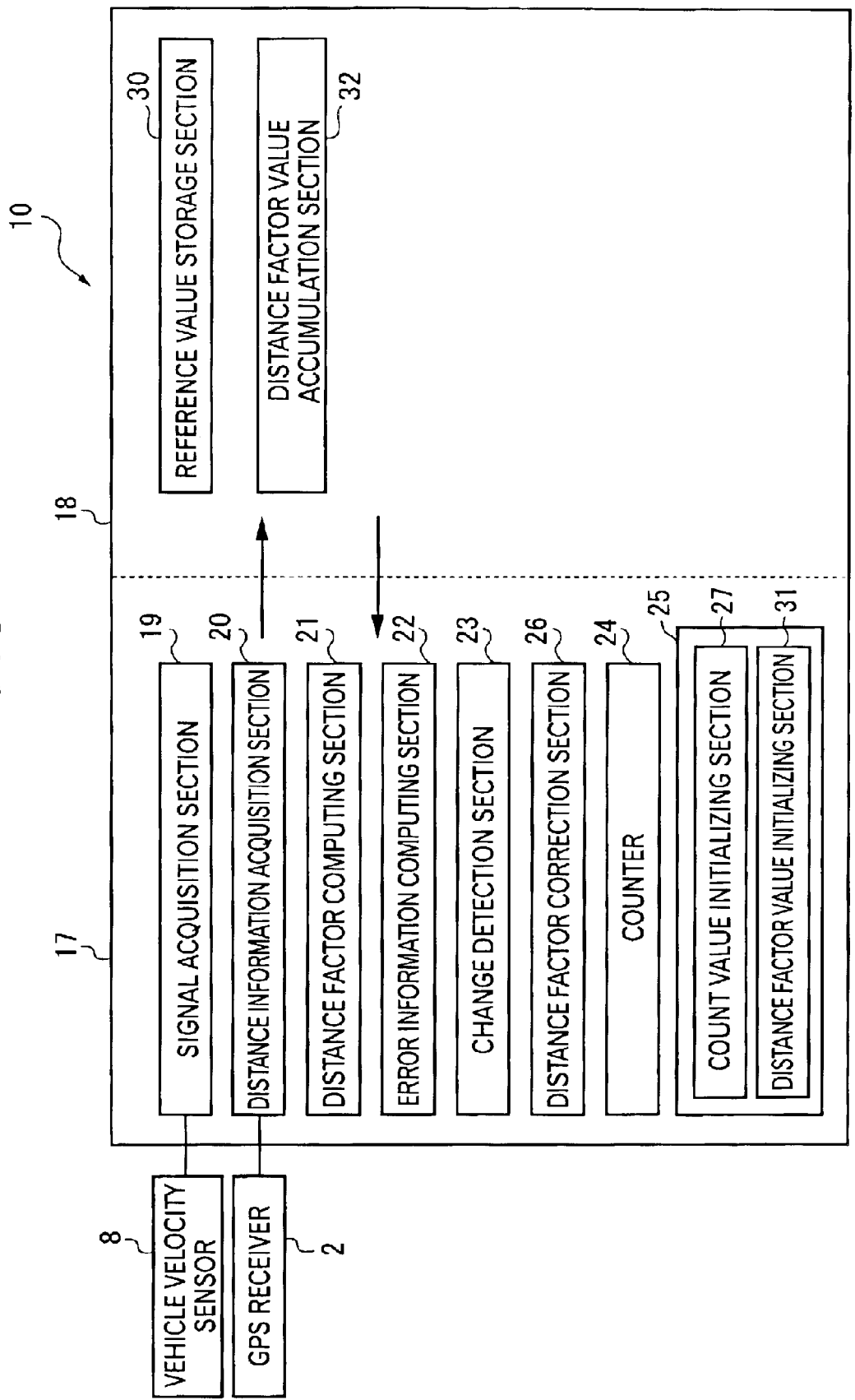
FIG. 5 is a diagram, showing the general arrangement of a distance factor learning section as a distance factor learning device of a second embodiment of this invention.

FIG. 5 is a diagram, showing the general arrangement of distance factor learning section 10 as the distance factor learning device of the second embodiment.

After computing the distance factor value based on the GPS position movement amount and the number of vehicle velocity pulses, distance factor computing section 21 outputs the computed distance factor value to error information computing section 22 and to database 18.

In addition to being equipped with count value initializing section 27, described with the first embodiment, initializing section 25 is also equipped with a distance factor value initializing section 31. With this initialization section 25, when the signal from change detection section 23 is input, initialization of the count value of counter 24 is performed by count value initializing section 27. Also, deletion of the distance factor values Ki accumulated in database 18 is performed by distance factor value initializing section 31.

Distance factor correction section 26 acquires the distance factor values Ki accumulated in database 18 and computes the modified value A based on the acquired distance factor values Ki. The distance factor reference value G accumulated in database 18 is then replaced by this computed modified value A. More specifically, when a change of the vehicle's tire outer diameter is detected at change detection section 23, distance factor correction section 26 acquires the distance factor values Ki accumulated in database 18 and averages these accumulated distance factor values Ki to compute modified value A.

The distance factor reference value G that is stored in database 18 is then replaced by this computed modified value A.

Database 18 stores the output from processing unit 17 and also stores the distance factor reference value to be used in the computation of the relative movement distance or relative movement velocity at movement condition computing section 11. In addition to the reference value storage section 30 described with the first embodiment, this database 18 is equipped with a distance factor value accumulation section 32.

Distance factor value accumulation section 32 is arranged, for example, from a rewritable SRAM, etc., and accumulates the distance factor values Ki computed at distance factor computing section 21.

Figure 6:
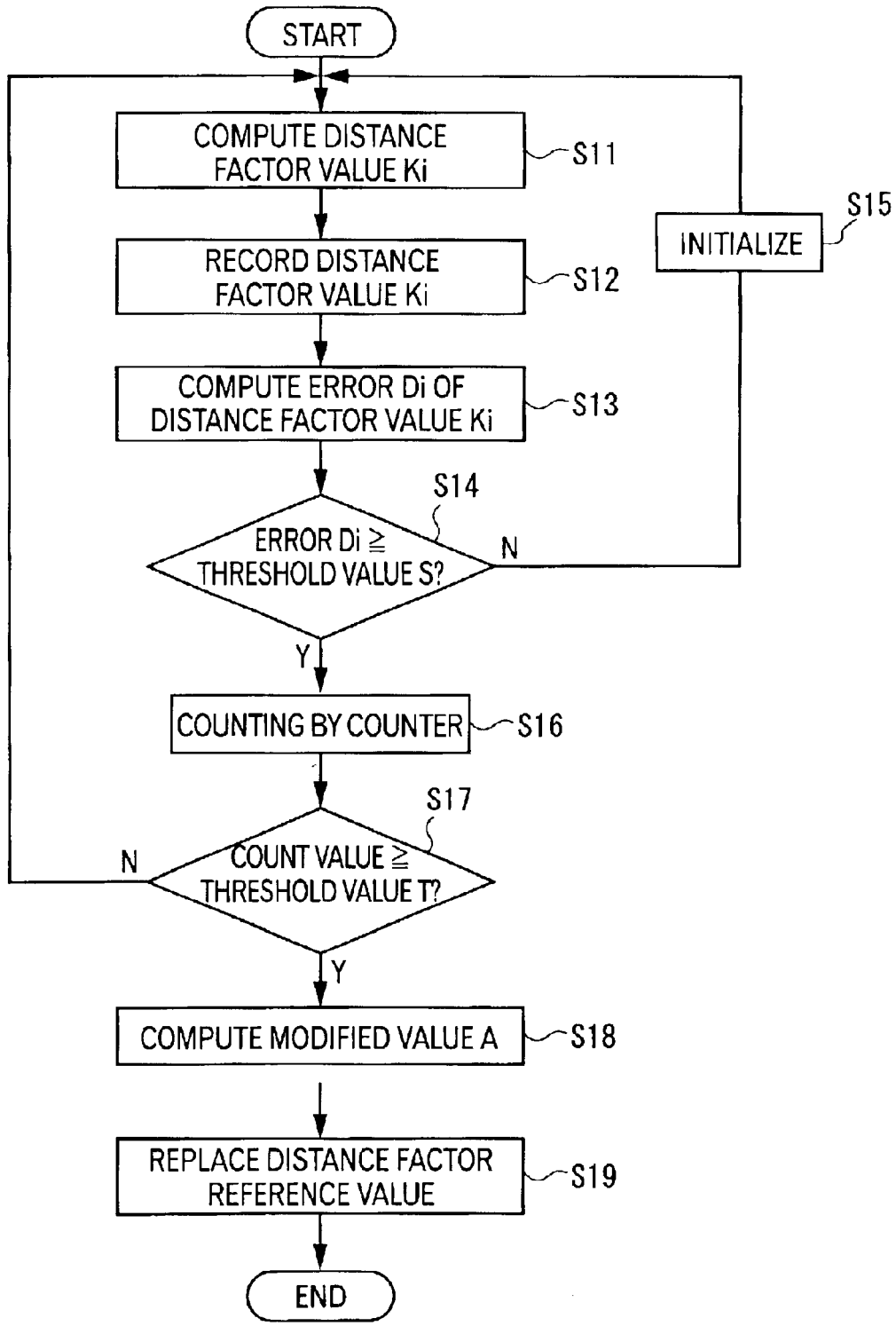
FIG. 6 is a flowchart, illustrating a distance factor learning method implemented by the distance factor learning section of the second embodiment of this invention.

The distance factor learning method of the above-described distance factor learning section 10 shall now be described with reference to the flowchart shown in FIG. 6.

First, as in the first embodiment, the computation of distance factor value Ki (step S11) is performed. Distance factor computing section 21 then outputs distance factor value Ki to distance factor value accumulation section 32 and distance factor value accumulation section 32 accumulates this distance factor value Ki (step S12).

After this step S12, the computation of the error Di of the distance factor value Ki (step S13) and the comparison of error Di and threshold value S (step S14) are performed as in the first embodiment.

If in step S14, error Di is found to be less than threshold value S as a result of comparison of error Di and threshold value S by change detection section 23, change detection section 23 outputs a signal to initializing section 25. Initialization of the count value of counter 24 is then performed by count value initializing section 27 and the deletion of the distance factor values Ki accumulated in distance factor value accumulation section 32 is performed by distance factor value initializing section 31 (step S15). A return to step S11 is then performed and the computing of distance factor value Ki at distance factor computing section 21 is performed again.

If in step S14, error Di is equal to or greater than threshold value S, change detection section 23 outputs a signal to counter 24 and counter 24 performs counting in accordance with this signal (step S16).

Change detection section 23 monitors counter 24 and judges whether or not the count value resulting from the counting at step S16 is equal to or greater than threshold value T (step S17).

If in step S17, the count value is less than threshold value T, a return to step S1 is performed again and the processes from step S11 to step S16 are repeated successively. That is, the above processes are repeated until the count value resulting from counting at counter 24 becomes equal to or greater than threshold value T. By repetition of the above-described processes, distance factor values Ki become accumulated successively in distance factor value accumulation section 32 while the counting by counter 24 proceeds.

If in repeating the above-described processes of step S11 to step S16, error Di is found to be less than threshold value S as a result of comparison of error Di and threshold value S by change detection section 23, change detection section 23 outputs a signal to initializing section 25. Initialization of the count value of counter 24 by count value initializing section 27 and the deletion of the accumulated distance factor values Ki by distance factor value initializing section 31 are then performed in step S14.

Since this distance factor value initializing section 31 thus performs the deletion of the distance factor values Ki accumulated in distance factor value accumulation section 32, when the count value of counter 24 becomes equal to or greater than threshold value T in step S17, only the distance factor values Ki, for which an error Di was found to be greater than or equal to threshold value S as a result of comparison of error Di with threshold value S at change detection section 23, will have been accumulated in distance factor value accumulation section 32.

If in step S17, the count value of counter 24 is equal to or greater than threshold value T, change detection section 23 outputs a signal to distance factor correction section 26. Distance factor correction section 26 then inputs this signal and acquires the distance factor values Ki accumulated in distance factor value accumulation section 32. Distance factor correction section 26 furthermore averages the acquired distance factor values Ki to compute a modified value A (step S18).

Distance factor correction section 26 then replaces the distance factor reference value G, stored in reference value storage section 30, by the computed modified value A (step S19).

After this replacement of the distance factor reference value, error information computing section 22 continues the computation of error Di based on the modified value A stored in reference value storage section 30. Movement condition computing section 11 computes the relative movement distance or relative movement velocity based on the modified value A stored in reference value storage section 30.

By repeating the processes described above, a modified value is computed after detection of a change of the vehicle's tire outer diameter. And by replacing the prior distance factor reference value by this computed modified value, appropriate relative movement distances or relative movement velocities are computed.

(Effects of the Second Embodiment)

With the above-described navigation device 1 of the second embodiment, distance factor correction section 26 averages the distance factor values Ki accumulated in distance factor value accumulation section 32 to compute modified value A after detection of a change of tire outer diameter. Distance factor correction section 26 then replaces the distance factor reference value G stored in reference value storage section 30 by this computed modified value A.

Since distance factor correction section 26 thus computes modified value A and replaces the prior distance factor reference value G by this computed modified value A as a result of a change of the vehicle's tire outer diameter, the distance factor reference value can be corrected appropriately and rapidly.

Also, distance factor correction section 26 averages the distance factor values Ki that have been accumulated in distance factor value accumulation section 32. By doing so, an appropriate modified value A can be computed even if a distance factor value Ki, which contains a computational error of the GPS position movement amount due to GPS receiver 2, etc., is included among the data accumulated in distance factor value accumulation section 32.

[Modifications of the Embodiments]

Though preferable embodiments of this invention were described above, this invention is not limited to these embodiments and various modifications and design changes are possible within a scope that does not fall outside the gist of this invention.

For example, though with navigation device 1 of each of the above-described embodiments, change detection section 23 detected a change of the vehicle's tire outer diameter based on the count value counted by counter 24, this invention is not limited thereto. For example, arrangements may be made so that a change of the vehicle's tire outer diameter is detected based on the count value of counter 24 that is counted within a predetermined time.

Though with navigation device 1 of each of the above-described embodiments, initializing section 25 performed the initialization of the count value of counter 24 and the deletion of the errors Di or distance factor values Ki accumulated in database 18 based on the signal output from change detection section 23, this invention is not limited thereto. For example, initializing section 25 may be equipped with a timer, etc., and the initialization of the count value of counter 24 and the deletion of the errors Di or distance factor values Ki accumulated in database 18 may be performed upon elapse of a predetermined time.

Though with the above-described first embodiment, an arrangement wherein the errors Di computed at error information computing section 22 are accumulated constantly in error information accumulation section 29 was described, this invention is not limited thereto. For example, arrangements may be made so that only the errors Di, with which error Di is found to be equal to or greater than the threshold value S as a result of comparison of error Di and threshold value S at change detection section 23, will be accumulated in error information accumulation section 29.

Likewise, though with the above-described second embodiment, an arrangement wherein the distance factor values Ki computed at distance factor value computing section 21 are accumulated constantly in distance factor value accumulation section 32 was described, this invention is not limited thereto. For example, arrangements may be made so that only the distance factor values Ki, which are used in the computation of the errors Di, with which error Di is found to be equal to or greater than the threshold value S as a result of comparison of error Di and the threshold value S at change detection section 23, will be accumulated.

Also, though a change of tire outer diameter due to tire exchange was described in regard to a movement characteristic of a mobile body, this invention may be applied for example to cases where a tire outer diameter changes due to air temperature or road surface temperature as well as to cases where the distance information or velocity information changes due to unevenness of the road surface, change of the state of contact with the road surface, etc.

What is claimed is:

1. A distance factor learning device comprising:
   a signal acquisition section, acquiring a signal that is generated in a accordance with the movement of a mobile body;
   a distance information acquisition section, acquiring distance information concerning the movement distance of said mobile body;
   a distance factor computing section, computing a distance factor value based on said signal and said distance information;

a reference value storage section, storing a distance factor reference value that is in accordance with at least a characteristic of a portion of said mobile body;

a change detection section, comparing said distance factor value with said distance factor reference value and thereby detecting a continuous change of said distance factor value; and a distance factor correction section, correcting said distance factor reference value when a continuous change of said distance factor value is detected by said change detection section.

2. The distance factor learning device as set forth in claim 1, further comprising:

an error information computing section, computing distance factor error information based on the distance factor value and the distance factor reference value; and wherein the distance factor correction section corrects the distance factor reference value based on this distance factor error information.

3. The distance factor learning device as set forth in claim 2, further comprising:

an error information accumulation section, accumulating the distance factor error information; and wherein when a continuous change of the distance factor value is detected by the change detection section, the distance factor correction section averages the distance factor error information, which, among the distance factor error information accumulated in said error information accumulation section, have been accumulated from the point in time of the start of said continuous change of the distance factor value, to compute a correction value for the distance factor reference value and corrects said distance factor reference value by adding or subtracting this correction value to or from said distance factor reference value.

4. The distance factor learning device as set forth in claim 1, wherein the distance factor correction section corrects the distance factor reference value based on the distance factor value.

5. The distance factor learning device as set forth n claim 4, further comprising:

a distance factor accumulation section, accumulating the distance factor values; and wherein when a continuous change of the distance factor value is detected by the change detection section, the distance factor correction section averages the distance factor values, which, among the distance factor values accumulated in said distance factor accumulation section, have been accumulated from the point in time of the start of said continuous change of the distance factor value, to compute a modified value of the distance factor reference value and corrects the distance factor reference value that is stored in the reference value storage section by replacing the stored reference value with the computed modified value.

6. The distance factor learning device as set forth in claim 1 further comprising:

an error information computing section, computing distance factor error information based on the distance factor value and the distance factor reference value; and a counter, counting the number of times the distance factor error information becomes equal to or greater than a threshold value; and wherein said change detection section detects that the distance factor value has changed in a continuous manner when the count value counted by said counter becomes equal to or greater than a threshold value.

7. The distance factor learning device as set forth in claim 6, further comprising:

an initializing section, initializing the counter in a case where the distance factor error information does not reach the threshold value.

8. The distance factor learning device as set forth in claim 1, wherein said reference value storage section stores the distance factor reference value that is in accordance with the outer diameter of a tire.

9. A movement condition computing device comprising:

the distance factor learning device as set forth in claim 1; and a movement condition computing section, computing movement distance information or velocity information on a mobile body based on a distance factor reference value that is corrected by the distance factor learning device.

10. A present position computing device comprising the movement condition computing device as set forth in claim 9;

a direction information acquisition section, acquiring traveling direction information that indicates the traveling direction of said mobile body;

a movement condition recognition section, computing the relative movement distance and relative movement direction of said mobile body at each unit time based on the movement distance information or velocity information computed at said movement condition computing device and the traveling direction information acquired at said direction information acquisition section and recognizing the movement condition of said mobile body based on an accumulation of the relative movement distance and the relative movement direction; and a present position determination section, determining the present position of said mobile body based on the movement condition of the mobile body recognized by the movement condition recognition section.

11. A distance factor learning method comprising the steps of:

acquiring a signal, which is generated in accordance with the movement of a mobile body, and distance information concerning the movement distance of said mobile body;

computing a distance factor value based on the acquired signal and distance information;

comparing the computed distance factor value with a distance factor reference value that is in accordance with at least a characteristic of a portion of said mobile body to detect a continuous change of said distance factor value; and correcting said distance factor reference value when a continuous change of the distance factor value is detected.

12. The distance factor learning method as set forth in claim 11, further comprising the step of:

computing distance factor error information based on the distance factor value and the distance factor reference value; and wherein the distance factor reference value is corrected based on this computed distance factor error information.

13. The distance factor learning method as set forth in claim 12, further comprising the step of:

accumulating the distance factor error information; and wherein when a continuous change of the distance factor value is detected the distance factor error information, which, among the accumulated distance factor error information, have been accumulated from the point in time of the start of said continuous change of the distance factor value, are averaged to compute a correction value for the distance factor reference value and said distance factor reference value is corrected by adding or subtracting this correction value to or from said distance factor reference value.

14. The distance factor learning method as set forth in claim 11, wherein the distance factor reference value is corrected based on the distance factor value.

15. The distance factor learning method as set forth in claim 14, further comprising the step of:

accumulating the distance factor values; and wherein when a continuous change of the distance factor value is detected ,the distance factor values, which, among the accumulated distance factor values, have been accumulated from the point in time of the start of said continuous change of the distance factor value, are averaged to compute a modified value of the distance factor reference value and the distance factor reference value is corrected by being replaced by the computed modified value.

16. The distance factor learning method as set forth in of claim 11, further comprising the steps of:

computing distance factor error information based on the distance factor value and the distance factor reference value; and counting the number of times the distance factor error information becomes equal to or greater than a threshold value; and wherein that the distance factor value has changed in a continuous manner is detected when the count value that is counted becomes equal to or greater than a threshold value.

17. The distance factor learning method as set forth in claim 16, further comprising the step of:

initializing the counted count value in a case where the distance factor error information does not reach the threshold value.

18. A distance factor learning program for making a computer execute the distance factor learning method as set forth in claim 11.

19. A recording medium, wherein the distance factor learning program as set forth in claim 18 is recorded in a manner that is readable by a computer.

20. The distance factor learning method as set forth in claim 11, wherein the step of comparing includes the step of comparing the computed distance factor value with the distance factor reference value that is in accordance with the outer diameter of a tire.

21. A distance factor learning device comprising:

a signal acquisition section, acquiring a signal that is generated in accordance with the movement of a mobile body;

a distance information acquisition section, acquiring distance information concerning the movement distance of said mobile body;

a distance factor computing section, computing a distance factor value based on said signal and said distance information;

a reference value storage section, storing a distance factor reference value that is in accordance with the movement characteristics of said mobile body;

a change detection section, comparing said distance factor value with said distance factor reference value and thereby detecting a continuous change of said distance factor value;

a distance factor correction section, correcting said distance factor reference value when a continuous change of said distance factor value is detected by said change detection section; and an error information computing section, computing distance factor error information based on the distance factor value and the distance factor reference value, wherein the distance factor correction section corrects the distance factor reference value based on this distance factor error information.

22. The distance factor learning device as set forth in claim 21, further comprising an error information accumulation section, accumulating the distance factor error information, wherein when a continuous change of the distance factor value is detected by the change detection section, the distance factor correction section averages the distance factor error information, which, among the distance factor error information accumulated in said error information accumulation section, have been accumulated from the point in time of the start of said continuous change of the distance factor value, to compute a correction value for the distance factor reference value and corrects said distance factor reference value by adding or subtracting this correction value to or from said distance factor reference value.

23. A distance factor learning device comprising:

a signal acquisition section, acquiring a signal that is generated in accordance with the movement of a mobile body;

a distance information acquisition section, acquiring distance information concerning the movement distance of said mobile body;

a distance factor computing section, computing a distance factor value based on said signal and said distance information;

a reference value storage section, storing a distance factor reference value that is in accordance with the movement characteristics of said mobile body;

a change detection section, comparing said distance factor value with said distance factor reference value and thereby detecting a continuous change of said distance factor value;

a distance factor correction section, correcting said distance factor reference value when a continuous change of said distance factor value is detected by said change detection section; and a distance factor accumulation section, accumulating the distance factor values, wherein the distance factor correction section corrects the distance factor reference value based on the distance factor value, and wherein when a continuous change of the distance factor value is detected by the change detection section, the distance factor correction section averages the distance factor values, which, among the distance factor values accumulated in said distance factor accumulation section, have been accumulated from the point in time of the start of said continuous change of the distance factor value, to compute a modified value of the distance factor reference value and corrects the distance factor reference value that is stored in the reference value storage section by replacing the stored reference value with the computed modified value.

24. A distance factor learning device comprising:
a signal acquisition section, acquiring a signal that is generated in accordance with the movement of a mobile body;
a distance information acquisition section, acquiring distance information concerning the movement distance of said mobile body;
a distance factor computing section, computing a distance factor value based on said signal and said distance information;
a reference value storage section, storing a distance factor reference value that is in accordance with the movement characteristics of said mobile body;
a change detection section, comparing said distance factor value with said distance factor reference value and thereby detecting a continuous change of said distance factor value;
a distance factor correction section, correcting said distance factor reference value when a continuous change of said distance factor value is detected by said change detection section;
an error information computing section, computing distance factor error information based on the distance factor value and the distance factor reference value; and
a counter, counting the number of times the distance factor error information becomes equal to or greater than a threshold value,
wherein said change detection section detects that the distance factor value has changed in a continuous manner when the count value counted by said counter becomes equal to or greater than a threshold value.

25. The distance factor learning device as set forth in claim 24, further comprising an initializing section initializing the counter in a case where the distance factor error information does not reach the threshold value.

26. A distance factor learning method comprising the steps of:
acquiring a signal, which is generated in accordance with the movement of a mobile body, and distance information concerning the movement distance of said mobile body;
computing a distance factor value based on the acquired signal and distance information;
comparing the computed distance factor value with a distance factor reference value that is in accordance with the movement characteristics of said mobile body to detect a continuous change of said distance factor value;
correcting said distance factor reference value when a continuous change of the distance factor value is detected; and
computing distance factor error information based on the distance factor value and the distance factor reference value,
wherein the distance factor reference value is corrected based on this computed distance factor error information.

27. The distance factor learning method as set forth in claim 26, further comprising the step of accumulating the distance factor error information,
wherein when a continuous change of the distance factor value is detected, the distance factor error information, which, among the accumulated distance factor error information, have been accumulated from the point in time of the start of said continuous change of the distance factor value, are averaged to compute a correction value for the distance factor reference value and said distance factor reference value is corrected by adding or subtracting this correction value to or from said distance factor reference value.

28. A distance factor learning method comprising the steps of:
acquiring a signal, which is generated in accordance with the movement of a mobile body, and distance information concerning the movement distance of said mobile body;
computing a distance factor value based on the acquired signal and distance information;
comparing the computed distance factor value with a distance factor reference value that is in accordance with the movement characteristics of said mobile body to detect a continuous change of said distance factor value;
correcting said distance factor reference value when a continuous change of the distance factor value is detected; and
accumulating the distance factor values,
wherein the distance factor reference value is corrected based on the distance factor value, and
wherein when a continuous change of the distance factor value is detected, the distance factor values, which, among the accumulated distance factor values, have been accumulated from the point in time of the start of said continuous change of the distance factor value, are averaged to compute a modified value of the distance factor reference value and the distance factor reference value is corrected by being replaced by the computed modified value.

29. A distance factor learning method comprising the steps of:
acquiring a signal, which is generated in accordance with the movement of a mobile body, and distance information concerning the movement distance of said mobile body;
computing a distance factor value based on the acquired signal and distance information;
comparing the computed distance factor value with a distance factor reference value that is in accordance with the movement characteristics of said mobile body to detect a continuous change of said distance factor value;
correcting said distance factor reference value when a continuous change of the distance factor value is detected;
computing distance factor error information based on the distance factor value and the distance factor reference value; and
counting the number of times the distance factor error information becomes equal to or greater than a threshold value,
wherein that the distance factor value has changed in a continuous manner is detected when the count value that is counted becomes equal to or greater than a threshold value.

30. The distance factor learning method as set forth in claim 29, further comprising the step of initializing the counted count value in a case where the distance factor error information does not reach the threshold value.

31. A present position computing device comprising:
a movement condition computing device,
wherein said movement condition computing device includes a distance factor learning device, and a movement condition computing section, computing movement distance information or velocity information on a mobile body based on a distance factor reference value that is corrected by the distance factor learning device,
wherein the distance factor learning device includes a signal acquisition section, acquiring a signal that is generated in accordance with the movement of a mobile body, a distance information acquisition section, acquiring distance information concerning the movement distance of said mobile body, a distance factor computing section, computing a distance factor value based on said signal and said distance information, a reference value storage section, storing a distance factor reference value that is in accordance with the movement characteristics of said mobile body, a change detection section, comparing said distance factor value with said distance factor reference value and thereby detecting a continuous change of said distance factor value, and a distance factor correction section, correcting said distance factor reference value when a continuous change of said distance factor value is detected by said change detection section;
a direction information acquisition section, acquiring traveling direction information that indicates the traveling direction of said mobile body;
a movement condition recognition section, computing the relative movement distance and relative movement direction of said mobile body at each unit time based on the movement distance information or velocity information computed at said movement condition computing device and the traveling direction information acquired at said direction information acquisition section and recognizing the movement condition of said mobile body based on an accumulation of the relative movement distance and the relative movement direction; and
a present position determination section, determining the present position of said mobile body based on the movement condition of the mobile body recognized by the movement condition recognition section.

* * * * *